May 17, 1932. B M. OSWELL 1,859,109
MEASURING AND DISPENSING CONTAINER
Filed Nov. 21, 1930
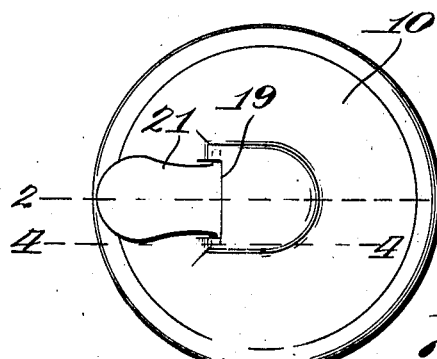
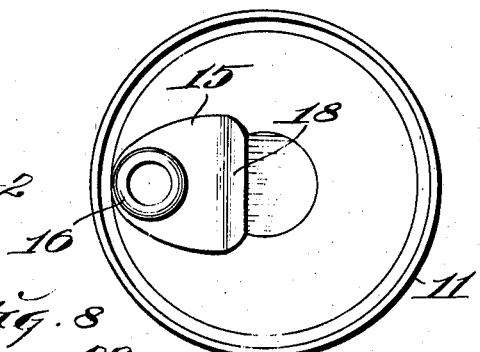
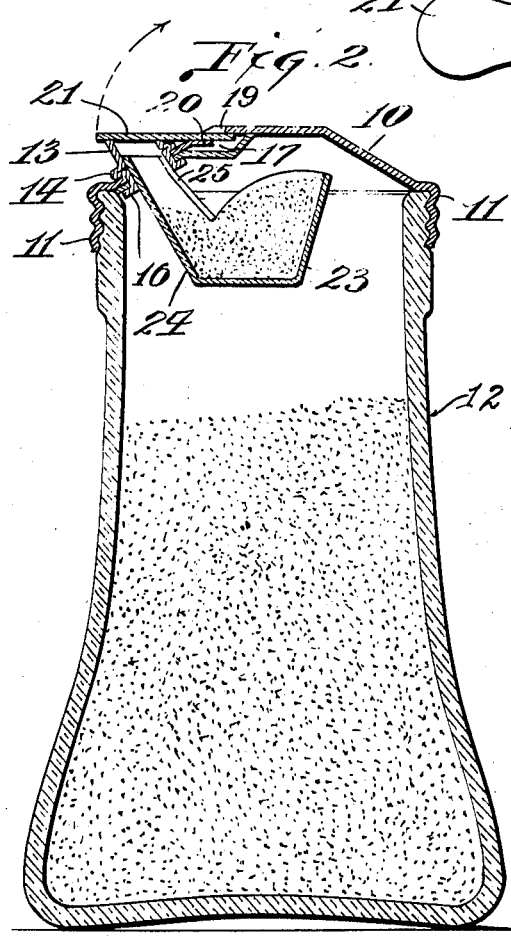
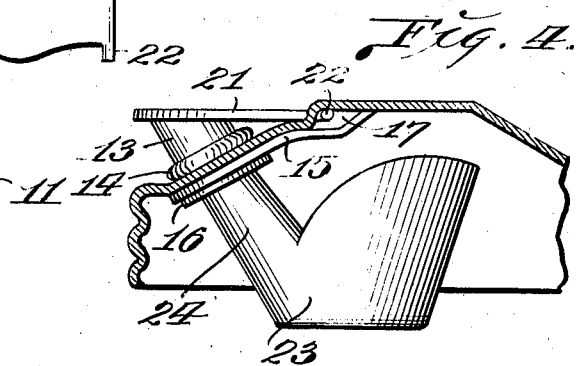
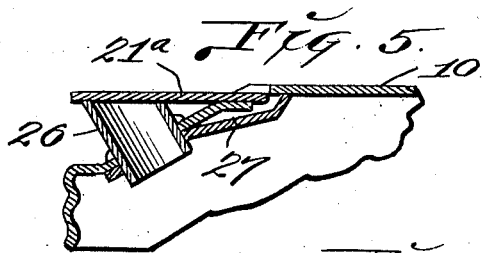
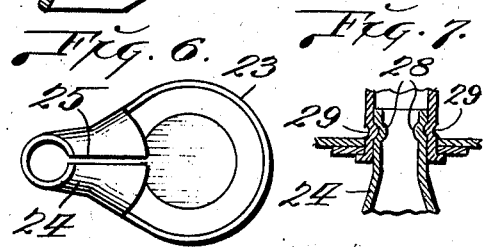
INVENTOR,
BENJ. M. OSWELL.
BY *Martin P. Smith* ATTY.

Patented May 17, 1932

1,859,109

UNITED STATES PATENT OFFICE

BENJAMIN M. OSWELL, OF LOS ANGELES, CALIFORNIA

MEASURING AND DISPENSING CONTAINER

Application filed November 21, 1930. Serial No. 497,180.

My invention relates to a measuring and dispensing container that is particularly designed for use on dining tables and counters for the convenient measuring and dispensing predetermined amounts of sugar or other pulverized or granular substances and my present invention is an improvement upon a similar device that forms the subject matter of my co-pending application for U. S. Letters Patent filed June 12, 1930, Serial No. 460,603.

The principal objects of my invention are, to generally improve upon and simplify the construction of the measuring and dispensing container disclosed in my aforesaid co-pending patent application as well as other forms of similar devices, further, to provide an improved form of spout through which the contents of the container are discharged and to provide relatively simple, inexpensive and convenient means for securing said spout to the cover of the container and further, to provide said spout with a hinged cover that opens and closes by gravity and which cover affords complete protection for the contents of the container and prevents the ingress of dust, insects and the like and consequently preventing contamination of the contents of the container.

Further objects of my invention are, to provide a measuring cup that is detachably connected to the discharge spout and which is effective in measuring and dispensing predetermined amounts of pulverized granular material from the container and further, to provide a measuring and dispensing container of the character referred to that may be readily cleaned and thereby maintained in a sanitary condition and the use of which measuring and dispensing container will be effective in eliminating unintentional excessive use and waste of the granular substance that is dispensed or discharged from the container.

With the foregoing and other objects in view, my invention consists in certain novel features of construction and arrangement of parts that will hereinafter be more fully described and claimed and illustrated in the accompanying drawings in which:

Fig. 1 is a top plan view of a cap or cover that is equipped with my improved measuring and dispensing device.

Fig. 2 is a cross section taken on the line 2—2 of Fig. 1 and showing the cover and dispensing device positioned on a container for sugar or other granular substance.

Fig. 3 is a view looking against the underside of the cover with the measuring cup detached therefrom.

Fig. 4 is an enlarged cross section taken on the line 4—4 of Fig. 1.

Fig. 5 is a cross section similar to Fig. 4 and showing a modified form of the spout attaching means.

Fig. 6 is a top plan view of the measuring cup that is utilized in connection with the spout.

Fig. 7 is a cross section showing a modified form of the connection between the measuring cup and the discharge spout.

Fig. 8 is a plan view of the gravity cover that closes the upper end of the discharge spout.

Referring by numerals to the accompanying drawings which illustrate a practical embodiment of my invention, 10 designates a cap or cover preferably pressed from sheet metal, in the form of a low truncated cone and provided with a depending marginal flange 11, in which is pressed a thread that engages an external thread on the upper end of a jar or container 12. This jar or container is preferably formed of glass, porcelain or the like and may be of any convenient size and shape.

Formed in the inclined wall of the cap or cover 10 to one side of the center thereof, is an opening for a short tubular spout 13, preferably formed of metal and having its intermediate portion pressed outwardly to form a bead or flange 14, which when the spout is applied to the cap rests directly on top of the wall of the cap or cover.

A plate 15 of metal is positioned against the underside of the cap or cover and one end of this plate is provided with an opening for the reception of that portion of the tubular spout 13, that projects downwardly through the wall of the cap and the lower end portion of the tube 13 is pressed outwardly to form a flange 16 that engages the underface of the plate 15 and clamps the same to the wall of the cap.

The inner portion of the plate 15 is bent downwardly away from the wall of cap 10, thereby providing a shallow chamber 17, between the inner portion of said plate and the cap and the extreme inner end of plate 15 is bent upwardly to form a narrow lip 18 that serves as an end wall for the chamber 17 and the upper edge of this lip engages the undersurface of the flat central portion of the cap or cover 10.

The wall of cap 10 is slotted to form a transverse opening 19 between the spout 13 and the flat central portion of the cap and the metal in the wall of the cap immediately in front of this opening 19 is bent downwardly to form a short horizontally disposed lip 20 that occupies a plane parallel with and slightly below the plane occupied by the flat central portion of cap 10.

The inner or rear portion of a tongue-shaped cover 21 extends through slot 19 and formed on the sides of said cover at the rear end thereof, are short outwardly projecting pintles 22, which occupy the chamber 17 and which engage beneath the cover plate 10 at the ends of said chamber, thereby forming an axis on which the cover swings.

The upper end of tube 13 occupies a horizontal plane which is coincident with the plane occupied by the upper surface of lip 20 and when the container 12 rests on a table or other flat surface, cover 21 occupies a horizontal position, as illustrated in Fig. 2, with its rear portion resting on top of lip 20 and with its outer portion overlying the upper end of tube 13 and effectually closing the passageway therethrough.

Thus while the dispensing container is not in use the cover 21 closes the upper end of spout 13 and prevents dust, moisture and insects from entering the container through the spout.

The measuring device forming a part of my invention, comprises a small cup 23, which may be pressed from suitable sheet metal, said cup having a predetermined capacity, for instance, one teaspoonful, and projecting upwardly and outwardly from one side of said cup is a tubular member 24 that is split lengthwise along its upper portion so as to form a slot 25.

The metal from which the cup and tubular member are formed is resilient to a certain degree and thus the upper end of the tubular member 24 may be contracted slightly so as to permit said upper end to be inserted in the tubular spout 13 and when the contracted portion of the inserted member expands as a result of the resiliency of the metal the cup will be firmly secured to the cap 10 with its open upper end positioned a slight distance below the central portion of the wall of cap 10.

In the use of my improved measuring and dispensing container the jar or bowl 10 is manually engaged and inverted and in so doing the cover 21 will swing away from the upper end of spout 13 and the sugar or other granular substance within the cup 23 and lower portion of tubular member 24 will discharge through said tubular member and the spout 13. As the jar is thus inverted the body of granular substance within the jar will by gravity pass to the lower portion thereof, thereby completely imbedding the cup and a portion of the granular substance will enter said cup and likewise a portion will fill the space between the upper edge of the cup and the adjacent wall of the cap 10.

While the bowl or jar is inverted and after the pulverized material has discharged from the cup, it is impossible for any more material to discharge from the container owing to the construction of the cup and the tubular member 24 that leads to the discharge spout 13.

After having been inverted to effect a discharge of a predetermined amount of sugar or the like, the container is turned to its normal upright position, whereupon the body of sugar or other material within the container will by gravity pass to the lower portion of said container and that portion of the sugar between the upper edge of cup 23 and the top 10 will, by gravity, pass into said cup, to be discharged therefrom on the subsequent inversion of the container.

As the container is turned back to its normal upright position, the cover 21 will by gravity swing into closed position on top of the tubular spout 13.

In Fig. 5, I have illustrated a modified form of the discharge spout that leads from the cap or cover 10 and in this construction a short tube 26 is inserted through an opening in the cover 10 and secured thereto by solder.

A plate 27 that corresponds to the plate 15, has one end perforated and pressed onto the inwardly projecting end of the tubular spout 26 and the inner portion of this plate 27 provides a housing for the hinged inner end of the discharge spout cover plate 21ª.

In the modified construction illustrated in Fig. 7, the upper end of the tube 24 that projects upwardly from cup 23, is provided on opposite sides with indented portions 28 and which, when the end of said member 24 is inserted in the lower portion of the material discharge spout 13, receive studs 29 that are formed by pressing the wall of the discharge spout inwardly to a slight degree.

This construction provides efficient means for detachably connecting the cup to the cap or cover 10.

Thus it will be seen that I have provided a measuring and dispensing container that is relatively simple in construction, inexpensive of manufacture, capable of being readily cleansed so as to be maintained in a sanitary condition and the construction of the container being such that only a predetermined quantity of the granular substance within the container can be discharged at one operation.

It will be understood that minor changes in the size, form and construction of the various parts of my improved measuring and dispensing container may be made and substituted for those herein shown and described without departing from the spirit of my invention, the scope of which is set forth in the appended claims.

I claim as my invention:

1. In a measuring and dispensing container, a cap adapted to be removably positioned on a receptacle, a discharge spout projecting from said cap, a measuring cup positioned beneath the central portion of said cap, a tubular member projecting upwardly from one side of said cup and the upper portion of which tubular member is slotted lengthwise and removably seated in the lower portion of said discharge spout.

2. In a measuring and dispensing container, a cap adapted to be removably positioned upon a container, a discharge spout projecting from said cap, said cap being slotted adjacent to said discharge spout, a cover plate having its inner portion projecting through said slot and hinged to said cap, the outer portion of which cover plate normally closes the upper end of the discharge spout and a plate arranged on the underside of the cap and forming a housing for that portion of the cover plate that projects through the slot in the cap.

3. In a measuring and dispensing container, a cap adapted to be removably positioned upon a container, a discharge spout projecting from said cap, said cap being slotted adjacent to said discharge spout, a cover plate having its inner portion projecting through said slot and hinged to said cap, the outer portion of which cover plate normally closes the upper end of the discharge spout, a plate arranged on the under side of the cap and forming a housing for that portion of the cover plate that projects through the slot in the cap, a measuring cup positioned beneath the central portion of said cap and a tubular member projecting upwardly from one side of said cup and having its upper end portion removably seated in the lower portion of said discharge spout.

4. In a measuring and dispensing container, a measuring cup, a tubular member extending upwardly and outwardly from one side of said cup and the upper portion of which tubular member is slotted to permit said upper portion to expand and contract.

5. The combination with a container, of a cap removably positioned on said container, a discharge spout projecting from said cap and a measuring cup positioned beneath the central portion of said cap and having a longitudinally slotted tubular portion removably seated in said discharge spout.

In testimony whereof I affix my signature.

BENJAMIN M. OSWELL.